United States Patent
Konda et al.

(10) Patent No.: US 6,340,531 B1
(45) Date of Patent: Jan. 22, 2002

(54) INTERIOR TRIM FOR AUTOMOBILE

(75) Inventors: Akihiro Konda, Aichi-ken; Kazuo Ito, Toyoake; Kazunori Aotuka, Toyota; Yuichi Itoh, Ichihara; Akira Uchiyama, Ichihara; Toru Takehara, Ichihara, all of (JP)

(73) Assignee: Kojima Press Industry Co., Ltd., Aichi-ken (JP)

( * ) Notice: Subject to any disclaimer, the term of this patent is extended or adjusted under 35 U.S.C. 154(b) by 1145 days.

(21) Appl. No.: 08/812,916

(22) Filed: Mar. 10, 1997

Related U.S. Application Data

(63) Continuation of application No. 08/504,549, filed on Jul. 20, 1995, now abandoned.

(30) Foreign Application Priority Data

Jul. 20, 1994 (JP) .............................................. 6-167956

(51) Int. Cl.$^7$ ................................................ B32B 27/32
(52) U.S. Cl. ........................................ 428/516; 428/31
(58) Field of Search .......................... 428/31, 515, 516, 428/517; 296/39.1, 146.7, 70; 280/751, 752; 525/193, 194

(56) References Cited

U.S. PATENT DOCUMENTS

| | | | |
|---|---|---|---|
| 4,650,830 A | * 3/1987 | Yonekura et al. | 525/193 |
| 4,816,313 A | 3/1989 | Hosokawa et al. | 428/90 |
| 5,122,398 A | * 6/1992 | Seiler et al. | 428/31 |

FOREIGN PATENT DOCUMENTS

| | | |
|---|---|---|
| JP | 52-121663 | 10/1977 |
| JP | 64-22520 | 1/1989 |
| JP | B-412412 | 1/1992 |

* cited by examiner

Primary Examiner—Paul Thibodeau
Assistant Examiner—D. Lawrence Tarazano
(74) Attorney, Agent, or Firm—Birch, Stewart, Kolasch & Birch, LLP

(57) ABSTRACT

An trim material for the interior of an automobile obtained by successive injection molding. The trim comprises a surface layer and a base layer. The surface layer is formed from a composition comprising: (A) a partially cross-linked thermoplastic elastomer comprising a polypropylene resin and an α-olefin copolymer rubber, and (B) a polybutylene-1 resin. The base layer is formed of a polypropylene resin or a blend of polypropylene resin and an organic filler. The interior trim material is lightweight, is easily recycled, and generates no hazardous gas when incinerated.

9 Claims, 1 Drawing Sheet

INTERIOR TRIM FOR AUTOMOBILE

This application is a continuation of application Ser. No. 08/504,549 filed on Jul. 20, 1995, now abandoned.

DETAILED DESCRIPTION OF THE INVENTION

The present invention relates to an interior trim material for automobile use. More particularly, the present invention relates to an interior trim material for automobile use, which has excellent scratch resistance and which is obtained by successively injection-molding a surface layer and a base layer.

Polyolefin materials, which are lightweight and easily recyclable, are in wide use as an energy-saving and resource-saving type material in automobile parts, etc.

In recent years, polyolefin materials generating no hazardous gas when incinerated have come to be used in a large amounts from the standpoint of preservation of the global environment.

Conventional polyolefin materials, however, have a drawback of being inferior in scratch resistance to polyvinyl chloride resins. Therefore, when polyolefin materials are used in automobile parts, etc., it is necessary in some cases to subject them to a surface treatment by means of spray coating, knife coater or the like to improve their scratch resistance. This, however, invites a complex production process and gives a product of higher cost. Hence, improvement therefor has been desired.

The object of the present invention is to solve the above-mentioned problems associated with the prior art and provide, at a low cost and easily, an interior trim material for automobile use, which is obtained by successively injection-molding a surface layer (formed of a polyolefin composition with excellent scratch resistance) and a polypropylene base layer and which is lightweight, is easily recyclable and generates no hazardous gas when incinerated.

The interior trim material for automobile use according to the present invention can be obtained by successively injection-molding a surface layer and a base layer.

The composition constituting the surface layer comprises:

(A) a partially crosslinked thermoplastic elastomer comprising a polypropylene resin (a) and an α-olefin copolymer rubber (b), wherein the proportion of the polypropylene resin (a) and the α-olefin copolymer rubber (b) is 10 to 30 parts by weight and 90 to 70 parts by weight, respectively, per 100 parts by weight of the total of (a) and (b), and (B) a polybutene-1 resin, in which composition the proportion of the thermoplastic elastomer (A) and the polybutene-1 resin (B) is 95 to 65 parts by weight and 5 to 35 parts by weight, respectively, per 100 parts by weight of the total of (A) and (B).

The base layer is formed of a polypropylene resin or an inorganic filler-containing polypropylene resin.

Figure 1:
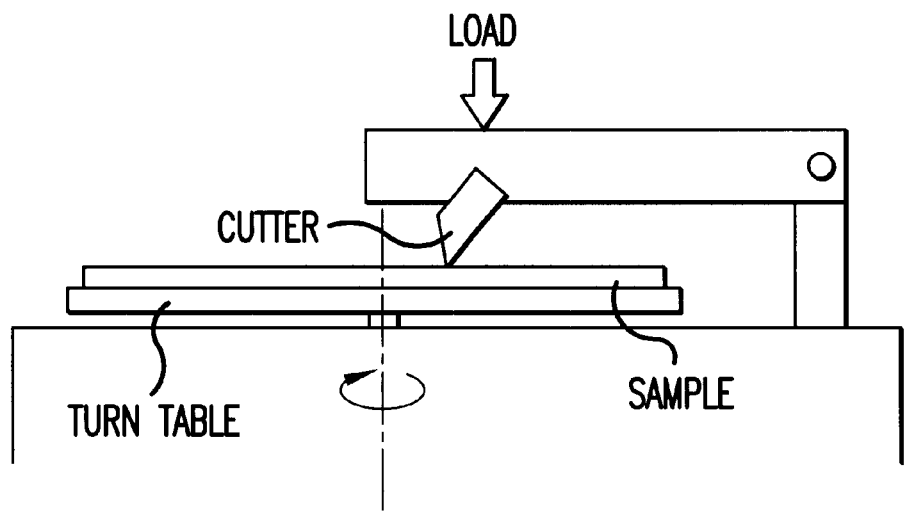
FIG. 1 is a schematic view of an apparatus for evaluating a scratch resistance.

The present invention is hereinafter described in detail.

Polypropylene resin (a)

The polypropylene resin (a) is preferably one of the following (co)polymers (1) to (3).

(1) A propylene homopolymer, (2) A random copolymer of propylene and 10 mole % or less of another α-olefins, or (3) A block copolymer of propylene and 30 mole % or less of another α-olefins.

The other α-olefin is specifically ethylene, 1-butene, 4-methyl-1-pentene, 1-hexene, 1-octene or the like. Of these (co)polymers, a propylene homopolymer or a propylene (major component)-ethylene copolymer is particularly preferable.

The polypropylene resin (a) may be used singly or in a combination of two or more.

The polypropylene resin (a) preferably has an MFR [melt flow rate; measured at 230° C. under a load of 2.16 kg (the same measurement conditions are applied hereinafter)] of 0.01 to 100.

The polypropylene resin (a) is used in an amount of 10 to 30 parts by weight, preferably 15 to 30 parts by weight per 100 parts by weight of the total of (a) and (b).

Olefin Copolymer Rubber (b)

The olefin copolymer rubber (b) is preferably an amorphous random elastic copolymer comprising mainly an α-olefin having 2–20 carbon atoms. The rubber (b) includes an α-olefin copolymer comprising two or more α-olefins, an α-olefin/non-conjugated diene copolymer comprising two or more α-olefins and a non-conjugated diene, a copolymer comprising mainly an olefin other than an α-olefin (described later), etc.

Specific examples of the copolymer rubber comprising mainly an α-olefin are as follows.

(1) An ethylene/α-olefin copolymer rubber having an ethylene/α-olefin molar ratio of, for example, about 90/10 to 50/50.

(2) An ethylene/α-olefin/non-conjugated diene copolymer rubber having an ethylene/α-olefin molar ratio of, for example, about 90/10 to 50/50.

(3) A propylene/α-olefin copolymer rubber having a propylene/α-olefin molar ratio of, for example, about 90/10 to 50/50.

(4) A butene/α-olefin copolymer rubber having a butene/α-olefin molar ratio of, for example, about 90/10 to 50/50.

Specific examples of the above α-olefin are ethylene, propylene, 1-butene, 4-methyl-1-pentene, 1-hexene, 1-octene and 1-decene.

Specific examples of the above non-conjugated diene are dicyclopentadiene, 1,4-hexadiene, cyclooctadiene, methylenenorbornene and ethylidenenorbornene.

The above copolymer rubbers preferably have a Mooney viscosity $ML_{1+4}$ (100° C.) of 10 to 250, particularly 30 to 150. The copolymer rubbers containing a non-conjugated diene as a copolymer component preferably have an iodine value of 25 or less.

The olefin copolymer rubber (b) may be present in a non-crosslinked state, a partially crosslinked state or a completely crosslinked state in the thermoplastic elastomer (A), while it is present preferably in a partially crosslinked state.

The olefin copolymer rubber (b) may be a rubber other than the above-mentioned copolymer rubbers comprising mainly an α-olefin. That is, it may be a diene rubber [e.g. styrene-butadiene rubber (SBR), nitrile rubber (NBR), natural rubber (NR) or butyl rubber (IIR)], a polyisobutylene or the like.

The olefin copolymer rubber (b) is used in an amount of 90 to 70 parts by weight, preferably 85 to 70 parts by weight per 100 parts by weight of the total of (a) and (b).

The thermoplastic elastomer (A) used in the present invention is a thermoplastic elastomer obtained by dynamically heat-treating, in the presence of, for example, an organic peroxide, a composition comprising the polypropylene resin (a) (e.g. a crystalline polypropylene) and the α-olefin copolymer rubber (b) (e.g. an ethylene/α-olefin copolymer rubber or an ethylene/α-olefin/non-conjugated diene copolymer rubber), at a weight ratio (propylene/rubber) of the polypropylene resin (a) and the α-olefin copolymer rubber (b) in the range of 10/90 to 30/70, the component (b) being partially crosslinked.

The thermoplastic elastomer (A) may further comprise, as required, additives such as a mineral oil type softener, heat stabilizer, antistatic agent, weathering stabilizer, antioxidant, filler, coloring agent, lubricant and the like as long as the object of the present invention is not impaired.

Specific examples of the organic peroxide used in production of the thermoplastic elastomer (A) include dicumyl peroxide, di-tert-butyl peroxide, 2,5-dimethyl-2,5-di-(tert-butylperoxy)hexane, 2,5-dimethyl-2,5-di-(tert-butylperoxy) hexyne-3, 1,3-bis(tert-butylperoxyisopropyl)benzene, 1,1-bis(tert-butylperoxy)-3,3,5-trimethylcyclohexane, n-butyl 4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butyl peroxyisopropylcarbonate, diacetyl peroxide, lauroyl peroxide and tert-butylcumyl peroxide.

Of these, preferred are 2,5-dimethyl-2,5-di-(tert-butyl peroxy)hexane, 2,5-dimethyl-2,5-di-(tert-butylperoxy) hexyne-3, 1,3-bis(tert-butylperoxyisopropyl)benzene, 1,1-bis(tert-butylperoxy)-3,3,5-trimethylcyclohexane and n-butyl 4,4-bis(tert-butylperoxy)valerate, in view of the odor and scorch stability. 1,3-Bis(tert-butylperoxyisopropyl) benzene is most preferred.

In the present invention, the organic peroxide is used in an amount of preferably 0.05 to 3 parts by weight, more preferably 0.1 to 1 part by weight per 100 parts by weight of the total of the polypropylene resin (a) and the α-olefin copolymer rubber (b).

In the present invention, when the above composition is subjected to the partial crosslinking treatment by the organic peroxide, there can be added, together with the peroxide, for example, a crosslinking aid such as sulfur, p-quinone dioxime, p,p'-dibenzoylquinone dioxime, N-methyl-N-4-dinitroisoaniline, nitrosobenzene, diphenylguanidine, trimethylolpropane-N,N'-m-phenylenedimaleimide or the like; a polyfunctional methacrylate monomer such as divinylbenzene, triallyl cyanurate, ethylene glycol dimethacrylate, diethylene glycol dimethacrylate, polyethylene glycol dimethacrylate, trimethylolpropane trimethacrylate, allyl methacrylate or the like; or a polyfunctional vinyl monomer such as vinyl butyrate, vinyl stearate or the like.

Use of the above compound, i.e., a crosslinking aid, a polyfunctional methacrylate monomer or a polyfunctional vinyl monomer, promises a uniform and mild crosslinking reaction. Divinylbenzene is most preferred in the present invention. Divinylbenzene is easy to handle, has good compatibility with the polypropylene resin (a) and the α-olefin copolymer rubber (b) which are the main components to be crosslinked, and has solubilizability for the peroxide used together with divinylbenzene and acts as a dispersing agent for the peroxide; therefore, when divinylbenzene is used, the crosslinking brought about by heat treatment is homogeneous and there can be obtained a thermoplastic elastomer well balanced in fluidity and physical properties.

In the present invention, the above crosslinking aid, the polyfunctional methacrylate monomer or the polyfunctional vinyl monomer is used preferably in an amount of 0.1 to 2% by weight, particularly 0.3 to 1% by weight based on the total of the components to be crosslinked. When the amount of the crosslinking aid, the polyfunctional methacrylate monomer or the polyfunctional vinyl monomer used is more than 2% by weight, the crosslinking reaction proceeds too rapidly and the resulting thermoplastic elastomer is inferior in fluidity when the amount of the organic peroxide used is large, whereas when the amount of the peroxide used is small, the crosslinking aid, the polyfunctional methacrylate monomer or the polyfunctional vinyl monomer remains unreacted in the resulting thermoplastic elastomer and the thermoplastic elastomer gives rise to change in physical properties due to heat history in mold-processing. Therefore, the crosslinking aid, the polyfunctional methacrylate monomer or the polyfunctional vinyl monomer should not be added in excess.

"Dynamically heat-treated" mentioned above refers to individual components being kneaded in a molten state.

As the kneading apparatus, there can be used a known kneading apparatus such as an open mixing roll, a closed Banbury mixer, an extruder, a kneader, a continuous mixer or the like. Of these, a closed kneading apparatus is preferred. Kneading is conducted preferably in an inert gas atmosphere such as nitrogen gas, carbon dioxide gas or the like.

Kneading is conducted desirably at a temperature at which the half-life of the organic peroxide used is less than 1 minute. The kneading temperature is generally a temperature of 150 to 280° C., preferably 170 to 240° C. The kneading time is 1 to 20 minutes, preferably 1 to 5 minutes. The shear force applied is generally in the range of 10 to $10^4$ sec$^{-1}$, preferably $10^2$ to $10^4$ sec$^{-1}$.

The thermoplastic elastomer (A) used in the present invention is partially crosslinked. The term "partially crosslinked" refers to that the thermoplastic elastomer (A) has a gel content of 20 to 99% by weight, as measured by the following measurement method. In the present invention, the thermoplastic elastomer (A) preferably has a gel content of 40 to 98% by weight. Mearument method for gel content (cyclohexane insoluble)

About 100 mg of a thermoplastic elastomer sample is weighed and cut into a small piece of 0.5 mm×0.5 mm×0.5 mm. Then, the small piece is immersed in 30 ml of cyclohexane in a closed vessel at 23° C. for 48 hours.

Then, the sample is taken out, placed on a filter paper, and dried at room temperature for 72 hours or more until a constant weight is reached.

The weight of the cyclohexane insoluble (e.g. fibrous filler, filler, pigment, etc.) other than the polymer components is deducted from the weight of the dried residue remaining on the filter paper, and the resulting value is taken as "corrected final weight (Y)".

Meanwhile, the weight of the cyclohexane soluble (e.g. softener) other than the polymer components and the weight of the cyclohexane insoluble (e.g. fibrous filler, filler, pigment, etc.) other than the polymer components are deducted from the weight of the sample, and the resulting value is taken as "corrected initial weight (X)".

The gel content (cyclohexane insoluble) of the sample is determined using the following equation.

$$\text{Gel content (\% by weight)} = [\text{corrected final weight (Y)}] \div [\text{corrected initial weight (X)}] \times 100$$

Polybutene-1 Resin (B)

The polybutene-1 resin (B) is preferably one of the following (co)polymers (1) to (3).

(1) A butene-1 homopolymer,
(2) A random copolymer of butene-1 and 10 mole % or less of another α-olefin
(3) A block copolymer of butene-1 and 30 mole % or less of another α-olefin, or α-olefins Specific examples of the above α-olefins are ethylene, propylene, 4-methyl-1-pentene, 1-hexene and 1-octene. As the polybutene-1 resin (B), particularly preferable is a butene-1 homopolymer or a butene-1 (major component)/ethylene or propylene random copolymer.

The polybutene-1 resin (B) may be used singly or in a combination of two or more.

The polybutene-1 resin (B) preferably has an MFR [melt flow rate; measured at 230° C. under a load of 2.16 kg] of 0.01 to 30.

The composition constituting the surface layer according to the present invention comprises the partially crosslinked thermoplastic elastomer (A) and the polybutene-1 resin (B) at an A/B weight ratio of 95/5 to 65/35.

The polybutene-1 resin (B) may further comprise, as required, additives such as a mineral oil type softener, heat stabilizer, antistatic agent, weathering stabilizer, antioxidant, filler, coloring agent, lubricant and the like as long as the object of the present invention is not impaired.

Polypropylene Resin

The base layer according to the present invention comprises a polypropylene resin or a composition of a polypropylene resin and an inorganic filler.

Specific examples of the polypropylene resin are the following (co)polymers.

(1) A propylene homopolymer,
(2) A random copolymer of propylene and 10 mole % or less of another α-olefin, or
(3) A block copolymer of propylene and 30 mole % or less of another α-olefin.

Specific examples of the other α-olefins include specifically ethylene, 1-butene, 4-methyl-1-pentene, 1-hexene, 1-octene or the like. Of these (co)polymers, a propylene homopolymer or a propylene (major component)-ethylene copolymer is particularly preferable.

The polypropylene resin may contain, as required, an inorganic filler. Examples of the inorganic filler are calcium carbonate, calcium silicate, clay, kaolin, talc, silica, diatomaceous earth, mica, asbestos, a glass fiber, glass beads, Shirasu balloons and graphite. Of these, talc is particularly preferable.

The polypropylene resin or the composition of a polypropylene and an inorganic filler may be a mixture of two or more kinds.

The polypropylene resin or the composition of a polypropylene and an inorganic filler preferably has an MFR [melt flow rate; measured at 230° C. under a load of 2.16 kg] of 0.01 to 100.

The polypropylene resin may further comprise, as required, additives such as a mineral oil type softener, heat stabilizer, antistatic agent, weathering stabilizer, antioxidant, filler, coloring agent, lubricant and the like as long as the object of the present invention is not impaired.

Interior Trim Material for Automobile Use, Obtained by Successive Injection Molding Specific examples of the interior trim material for automobile use, according to the present invention, obtained by successive injection molding are pillar garnish, air bag cover, door glove, console box, shift knob, assist grip, seat adjuster, lauver garnish, garage opener, sunvisor, back mirror cover, room mirror cover, cup holder, coin box, resist, ash tray upper, door frame garnish, door trim, armrest, column cover, inner panel and housing for garage opener.

The interior trim material for automobile use according to the present invention can be obtained by integrally molding a base layer and a surface layer by successive injection molding such as two-color rotary molding, insert molding or the like. Generally, a base layer is first molded and then a surface layer is molded. The base layer and the surface layer are heat-fused to each other, without using any adhesive.

The present invention is hereinafter described in more detail with reference to Examples.

In the Examples, scratch resistance was measured as follows.

Evaluation Method 1 for Scratch Resistance: Edge-scratching Method

A molded article was placed on a turn table of Taber Type Scratch Tester (a product of TOYO SEIKI SEISAKU-SHO, LTD.). A cutter edge (made of tungsten carbide) was fixed so that the front end of the edge was 3.5 cm distant from the rotational center of the turn table. (The direction of the cutter edge was opposite to that employed ordinarily). Then, the turn table was rotated at 0.5 rpm and a load of 300 g was applied to the cutter edge to scar the molded article. (See FIG. 1.) Thereafter, the degree of scar formed was examined.

Evaluation Method 2 for Scratch Resistance: Nail scratching Method

Three testers placed their hands on the surface of a molded article such that the back side of the hand was in contact with the surface thereof. The fingers were moved forward and backward 10 times with the back of each hand fixed, to scratch the molded article with nails and scar the molded article. Then, the degree of scar formed was examined.

Evaluation Method 3 for Scratch Resistance: Weight-dropping Method

Figure 2:
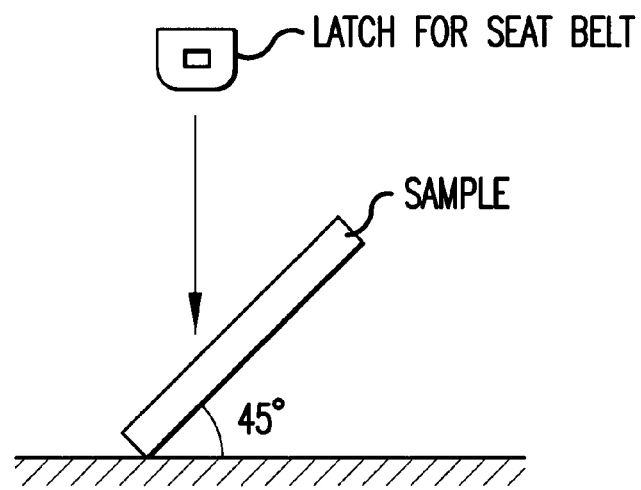
FIG. 2 is an explanatory drawing of an alternative method for evaluation a scratch resistance.

As shown in FIG. 2, a molded article was fixed onto a floor at an angle of 45°. A 250-g iron weight (a latch for seat belt) was dropped onto the molded article from a height of 10 cm. Then, the degree of scar formed was examined.

80 Parts by weight of an ethylene/propylene/-ethylidenenorbornene terpolymer [ethylene unit/propylene unit molar ratio=78/22, iodine value=15, Mooney viscosity $ML_{1+4}$ (121° C.)=61] was mixed with 20 parts by weight of an isotactic polypropylene [MFR=13 g/10 min (230° C.)]. 100 parts by weight of the resulting mixture was mixed, while stirring, with 1 part by weight of a mixture consisting of 50% by weight of di-tert-butyl peroxide, 40% by weight of divinylbenzene and 10% by weight of a paraffinic mineral oil, with a Henschel mixer.

The resulting mixture was fed into the cylinder of an extruder from the hopper and simultaneously, 19 parts by weight of a paraffinic process oil was directly injected into the cylinder by the use of a plunger pump, while extrusion was conducted at 210° C. in a nitrogen atmosphere to produce pellets of a thermoplastic elastomer (TPO). The TPO had a gel content of 95%.

The TPO pellets were mixed with pellets of a polybutene-1 resin [MFR=20 g/10 min (230° C.), PB-1] at a weight ratio shown in Table 1 with a Henschel mixer. The resulting mixture was again kneaded by the use of the extruder to produce pellets of a polyolefin composition.

Then, the polyolefin composition pellets and pellets of a propylene homopolymer [MFR=15 g/10 min (230° C.)] were subjected to successive injection molding with a two-color rotary injection molding machine (M-700AII-VR2-2CJ, a product of Meiki Co., Ltd.) to obtain a molded article comprising a base layer (a polypropylene resin) and a surface layer (a composition consisting of a TPO and a polybutene-1 resin). The molded article was measured for scratch resistance by the above-mentioned three methods. The results are shown in Table 1.

TABLE 1

|  | Example 1 | Example 2 | Example 3 | Comp. Example 1 | Comp. Example 2 |
|---|---|---|---|---|---|
| TPO | 90 | 80 | 70 | 100 | 60 |
| PB-1 | 10 | 20 | 30 | 0 | 40 |
| Properties [*1] | | | | | |
| 100% tensile stress (kg/cm$^2$) | 23 | — | — | 24 | — |
| Tensile strength at break (kg/cm$^2$) | 24 | 44 | 60 | 39 | 104 |
| Elongation at break (%) | 180 | 90 | 80 | 240 | 50 |
| Hardness (JIS A) | 52 | 70 | 77 | 47 | 85 |
| Scratch resistance [*2] | | | | | |
| Edge-scratching method | B | B | A | D | B |
| Nail-scratching method | A | A | A | D | A |
| Weight-dropping method | B | A | A | D | B |

[*1] Measured according to JIS K 6301
[*2] Rated according to the following criterion
  A: No scar
  B: Substantially no scar
  C: Scar is distinct
  D: Scar is very distinct
  E: Sample breakage or whitening According to the present invention there can be provided, at a low cost and easily, an interior trim material for automobile use, which is obtained by successively injection-molding a surface layer formed of a polyolefin composition of excellent scratch resistance and a base layer made of a polypropylene and which is lightweight, is easily recyclable and generates no harmful gas when incinerated.

What is claimed is:

1. An interior trim material for automotive use, obtained by successive injection molding, comprising:
   (I) a surface layer formed of a composition comprising a mixture of:
      (A) a partially crosslinked thermoplastic elastomer comprising (a) 10 to 30 parts by weight of a polypropylene resin and (b) 90 to 70 parts by weight of an α-olefin copolymer rubber per 100 parts by weight of the total of (a) and (b), and
      (B) a polybutene-1 resin, said polybutene-1 resin being added after the formation of the partially crosslinked thermoplastic elastomer, wherein the proportion of (A) the thermoplastic elastomer and (B) the polybutene-1 resin are 95 to 65 parts by weight and 5 to 35 parts by weight, respectively, per 100 parts by weight of the total of (A) and (B), and
   (II) a base layer formed of a polypropylene resin or a composition of a polypropylene resin and an inorganic filler.

2. An interior trim material for automotive use according to claim 1, wherein the polypropylene resin (a) constituting the thermoplastic elastomer (A) is selected from the group consisting of a propylene homopolymer, a random copolymer of propylene and 10 mole % or less of another α-olefin, and a block copolymer of propylene and 30 mole % or less of another α-olefin.

3. An interior trim material for automotive use according to claim 2, wherein the other α-olefin is at least one member selected from the group consisting of ethylene, 1-butene, 4-methyl-1-pentene, 1-hexene and 1-octene.

4. An interior trim material for automotive use according to claim 1, wherein the α-olefin copolymer rubber (b) constituting the thermoplastic elastomer (A) is selected from the group consisting of an ethylene/α-olefin copolymer rubber, an ethylene/α-olefin/non-conjugated diene copolymer rubber, a propylene/α-olefin copolymer rubber and a butene/α-olefin copolymer rubber.

5. An interior trim material for automotive use according to claim 1, wherein the thermoplastic elastomer (A) shows a gel content of 40 to 98% by weight.

6. An interior trim material for automotive use according to claim 1, wherein the polybutene-1 resin (B) is selected from the group consisting of a butene-1 homopolymer, a random copolymer of butene-1 and 10 mole % or less of another α-olefin, and a block copolymer of butene-1 and 30 mole % or less of another α-olefin.

7. An interior trim material use for automotive use according to claim 6, wherein the other α-olefin is at least one member selected from the group consisting of ethylene, propylene, 4-methyl-l-pentene, 1-hexene and 1-octene.

8. An interior trim material for automotive use according to claim 1, wherein the polypropylene resin constituting the base layer is selected from the group consisting of a propylene homopolymer, a random copolymer of propylene and 10 mole % or less of another α-olefin, and a block copolymer of propylene and 30 mole % or less of another α-olefin.

9. An interior trim material for automotive use according to claim 1, wherein the inorganic filler constituting the base layer is selected from the group consisting of calcium carbonate, calcium silicate, clay, kaolin, talc, silica, diatomaceous earth, a mica powder, asbestos, a glass fiber, glass beads, Shirasu balloons and graphite.

* * * * *